Dec. 16, 1969 J. LATTARD 3,484,786
MODULATED WAVE MECHANICAL GENERATOR
Filed June 2, 1966 4 Sheets-Sheet 3

United States Patent Office 3,484,786
Patented Dec. 16, 1969

3,484,786
MODULATED WAVE MECHANICAL GENERATOR
Jean Lattard, Boulogne-Billancourt, Hauts-de-Seine, France, assignor to Ateliers de Montages Electriques, Paris, France, a French corporation
Filed June 2, 1966, Ser. No. 554,851
Claims priority, application France, June 2, 1965, 19,324
Int. Cl. G01s 1/14
U.S. Cl. 343—109                3 Claims

ABSTRACT OF THE DISCLOSURE

A mechanical modulator in which a shaft driven at a constant speed by a motor supports two rotors having identical plate angular positions. A stator with two diametrically opposed plates is electrically coupled to one rotor and another stator having two diametrically opposed plates which are shifted by 90° as compared to the plates of the first-mentioned stator is coupled to the other rotor. The plates of one stator are connected to the terminals of a primary winding of an output transformer and the plates of the other stator are connected to the terminals of the primary winding of a second output transformer. The mid-points of the primary windings are grounded and each of the secondary windings also has a ground terminal.

---

This invention relates to a variable capacity unit for modulating by mechanical means a high frequency generator, and more particularly a variable capacity unit comprising a stator and a rotor fixed on a shaft driven by a motor revolving at a speed of $n$ r.p.s. and supplying, in a suitable plant energized with high frequency current $f$, an amplitude modulation by a low frequency equal to $n.p$, $p$ being the number of poles of the said rotor.

The most usual, but not the only, applications of such a modulated wave generator are in the realm of instrument landing systems (I.L.S.). Variable capacity mechanical modulators are well-known concerning an assembly of two multipole mechanical modulators, coupled on the same shaft and enabling the 90 and 150 c./s. lateral modulation bands of a high frequency wave to be obtained from each of them respectively for a speed of rotation of 30 r.p.s., i.e. 1800 r.p.m. In this well-known arrangement, the rotor of each modulator is made of a pile of circuits printed on both sides. The drawing of the circuits includes, on both sides, three pairs of poles for the 90 c./s. modulator and five pairs of poles for the 150 c./s. modulator. These poles are grouped by threes (or by fives) in two power supply lines so as to ensure alternation of the polarities and elimination of the output voltage at each ⅙ (or ⅒) revolution. Input coupling takes place by a constant-value rotating capacitor. The squaring of the second output compared to a first reference output is obtained by a 30° (18°) inclination of one pair of stators. When applied to an instrument landing system, only one of the two outputs is utilized; the other signal is dissipated in an artificial matching load; it serves to maintain a constant input impedance which is a considerable advantage. In the case of this well-known application, four variable capacities may be utilized in the branches of a bridge.

Accordingly, an object of this invention is to provide a mechanical modulator having a much simpler, more economic and rugged construction by adopting a differential transformer circuit called a "Jaumann cell," which is well-known in filter techniques. Two of the adjacent impedances of the aforesaid bridge are then replaced by the secondary windings of a transformer.

Another object of the invention is to provide a mechanical modulator energized with high frequency current $f$ by an external source, supplying lateral bands of frequencies $f-F$ and $f+F$, F being equal to the product of a number of poles $p$ of a rotor by the speed of rotation of the aforesaid rotor. The rotor is made of $p$ equipotential poles, and the output current is connected to the secondary winding of a transformer, the primary winding of which is connected to two fixed plates forming a stator coupled to the aforesaid rotor, the mid-point of the aforesaid primary winding being grounded.

A further object of the invention is to provide a second rotor coupled on the same shaft to the first rotor of the type defined above and staggered as compared to the aforesaid first rotor; supplying lateral bands having the same frequencies, and modulated in squaring (sine) as compared to the phases obtained from the first rotor (cosine).

Yet another object of the invention is to provide a rotor of the type defined above or the two above-mentioned rotors coupled together and energized with the high frequency current through a constant-value revolving capacitor.

Still another object of the invention is to provide a single multipole rotor coupled to a stator with two pairs of plates in squaring for supplying the lateral bands in sine and the lateral bands in cosine on the secondary windings of the two transformers, the primary windings of which are connected to the aforesaid two pairs of plates of the stator, and coupling of the high frequency being ensured by a constant-value revolving capacitor.

A further object of the invention is to provide a mechanical modulator supplying lateral bands in sine and lateral bands in cosine comprising two equipotential rotors and two stators, the high frequency being applied by two plates, one on each stator, joined to one of the poles of the high frequency generator, the other pole of which is grounded, and the output current being connected to the secondary windings of the two transformers, the primary windings of which are connected between the plates of the two different stators.

Still another object is to provide the mechanical modulator of the invention with a constant input impedance.

A still further object of the invention is to provide a high frequency wave generator modulated by two low frequencies, supplying the lateral bands only (carrier wave excluded), and comprising, a unit including a line-balancing device, a quarter-wavelength differential device and two mechanical modulators of the type described above, all associated with a high frequency generator.

Other objects and advantages will become apparent from a study of the following specification and drawings, in which.

Figure 1:
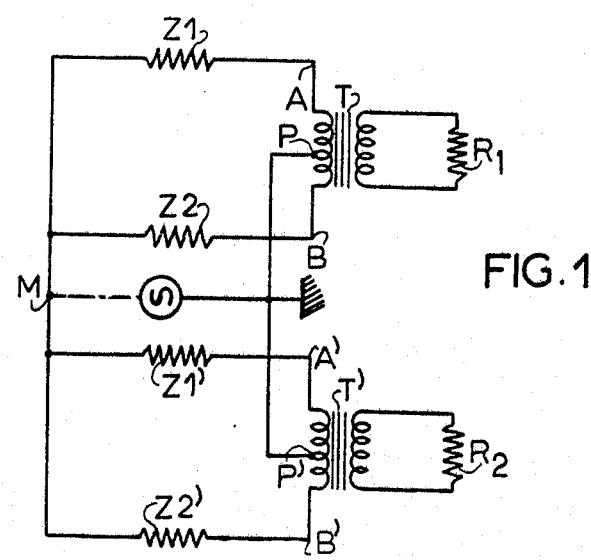
FIG. 1 is an equivalent electrical diagram explaining the principle of the operation of the mechanical modulator supplying lateral bands, the carrier wave excepted.

In FIGURE 1, a generator of a negligible internal impedance energizes two primary windings of transformers (TT') by the midpoints PP'. Impedances $Z_1$ and $Z_2$ are connected respectively between another terminal of the generator M and the ends A, B of the primary winding of the transformer. Impedances $Z'_1$ and $Z'_2$ are connected respectively between the aforesaid terminal M and the ends A', B' of the primary winding of the transformer T'. The secondary winding of T and that of T' are joined respectively to two equal resistors $R_1=R_2=R$.

The impedances $Z_1$ and $Z_2$ are variable capacities the laws of variation of which are:

$$Z_1 = \frac{Z}{1+\cos\theta}$$

$$Z_2 = \frac{Z}{1-\cos\theta}$$

The impedances $Z'_1$ and $Z'_2$ are variable capacities the laws of variation of which are:

$$Z'_1 = \frac{Z}{1+\sin\theta}$$

$$Z'_2 = \frac{Z}{1-\sin\theta}$$

$\theta$ being an angular co-ordinate defining the position common to all variable capacities, and Z being a constant.

An elementary calculation shows that the input impedance P ("cosine" part) is equal to:

$$Z_e = \frac{Z(2Z+R)}{4Z+2R(1-\cos^2\theta)}$$

The input impedance shown at P' ("sine" part) is equal to:

$$Z'_e = \frac{Z(2Z+R)}{4R+2R(1-\sin^2\theta)}$$

The impedance seen at the generator is equal to:

$$Z_e = \frac{Z(2Z+R)}{8Z+2R}$$

Figure 2:
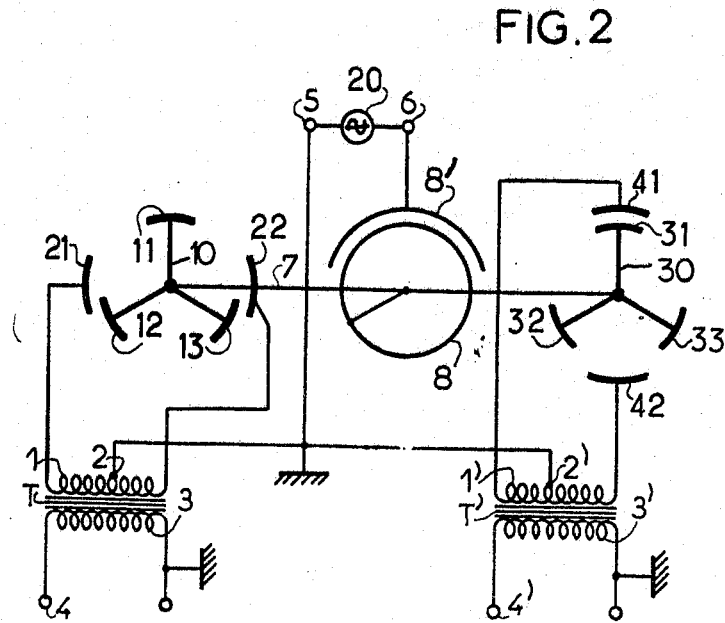
FIG. 2 is a schematic representation of a mechanical modulator according to the invention.

In FIGURE 2, a shaft 7, driven at a constant speed by a motor (not shown), bears two rotors each represented here as an example with three blades: rotor 10 with blades 11, 12, 13 and rotor 30 with blades 31, 32, 33, having angular positions identical to those of the blades or rotor 10. A stator with two diametrically opposed blades 21, 22 is coupled to the rotor 10. To the rotor 30, a stator is coupled having two diametrically opposed blades 41, 42 which are shifted by 90° as compared to the blades of the stator 21–22. The blades 21, 22 of the stator are connected to the terminals of the primary winding 1 of an output transformer T, the blades 41, 42 are connected to the terminals of the primary winding 1' of an identical output transformer T'. The mid-points 2, 2' of the primary windings are grounded. Each of the secondary windings 3 and 3' of the transformers T and T' has a ground terminal. The shape the bladse may take is well-known by those skilled in the art.

A high frequency current generator 20 is connected to terminals 5 and 6, the first being grounded. Terminal 6 serves to apply the high frequency current to the rotors 10 and 30 through a constant-value revolving capacitor 8–8', the rotor 8 of which is fixed on the shaft 7.

Let the frequency of the high frequency current of the generator 20 be $f$ and the frequency of the modulation be $F$. In the case of three-pole rotors as in the figure, the modulation frequency F is equal to $3n$, $n$ being the rotation speed of the shaft 7 in r.p.s. If $n$ is 30 r.p.s. (=1800 r.p.m.), the modulation frequency F is equal to 90 c./s.

On the terminal 4 of the secondary winding of the transformer T, two lateral bands of frequency $f-F$ and $f+F$ are obtained, having a phase, for instance, in sine. One the terminal 4', lateral bands with similar frequencies can be obtained having phases in cosine.

It is evident that in a mechanical modulator according to the invention, the three poles of a rotor are equipotential. There is no need to insert discs of printed circuit in order to insulate adjacent poles of reverse polarity. The rotor can be made entirely of metal. The input circuit not being symmetrical, it can be connected to a high frequency current source much more simply. The mechanical modulator of the invention is therefore remarkable for its simple and sound structure.

Figure 3:
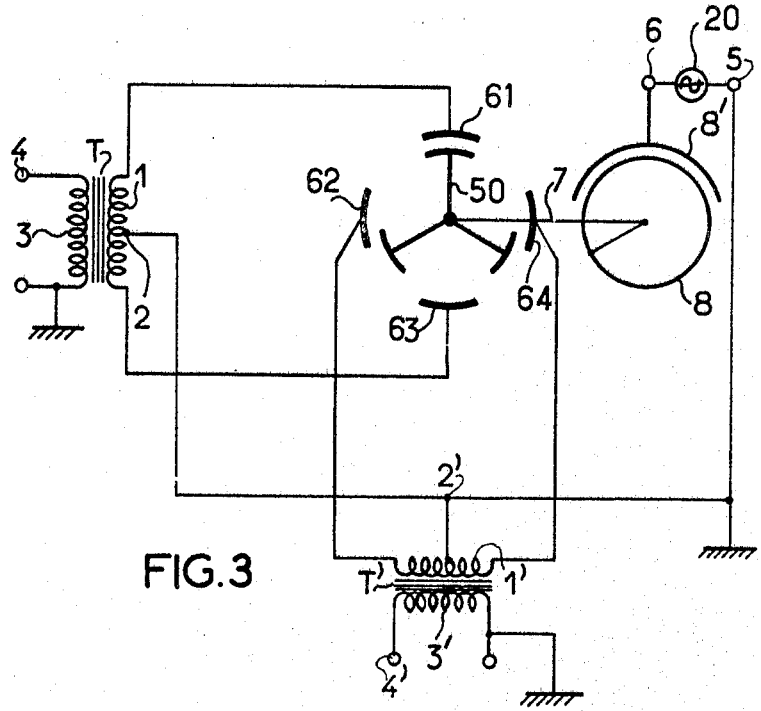
FIG. 3 shows a second embodiment of the invention.

In the embodiment shown in FIGURE 3, the squaring between the two modulated outputs is obtained by a displacement of two pairs of stators, coupled on the same rotor.

For a modulator with $p$ poles, the mechanical displacement between the pairs of stator blades has to be equal to:

$$\frac{(2K-1) \cdot 180°}{2p}$$

In the case of $p=3$, the displacement will be equal to 30° or 90°; in the case of $p=5$, it will be equal to 18°, 54° or 90°.

The angular width of the stator blades will be $180°/p$. A stator for 90 c./s. ($p=3$) will have a width of 60° and a stator for 150 c./s. ($p=5$) a width of 36°. It is therefore clear that a displacement of 90° can be adopted both for a three-pole modulator ($F=90$ c./s.) and for a modulator with 5 poles ($F=150$ c./s.).

In FIGURE 3, a stator with four blades (61, 62, 63, 64) is connected to a rotor 50. The numbers 1–8–8' and 1'–4' refer to the same elements as in FIGURE 2. The primary winding 1 is connected to the blades 61 and 63 of the stator and the primary winding 1' is connected to the blades 62, 64 of the stator.

Figure 4:
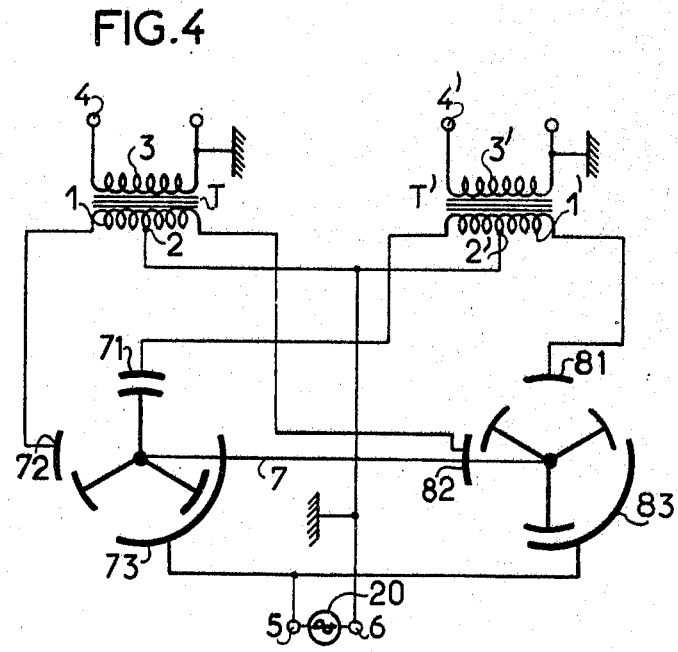
FIG. 4 shows a third embodiment of the invention.

In the embodiment shown in FIGURE 4, the high frequency current is applied to one blade of each of the two stators; there is no longer need for a rotary application capacitor (such as 8–8' in FIGURES 2 and 3). This arrangement is advantageous in that, at high frequencies, the connection ensured by the shaft 7 between the rotor 8 of the capacity coupling and the blades of the rotors generally presents a disturbing inductance, difficult to balance.

To produce a device such as that shown in FIGURE 4, two conditions are to be fulfilled:

(1) The capacity between the auxiliary application stator and the poles of the rotor has to remain constant during rotation;

(2) Room has to be found for the secondary stator between the stators serving to set apart the modulated bands.

The blades of the rotor are divided into two groups on a common metal axle. The poles of one group are shifted by $180°/p$ compared to the poles of the other group. Two stators comprise blades 71, 72, 73, and 81, 82, 83 respectively. Blades 71 and 81 have the same angular position, shifted by 90° compared to the common position of blades 72 and 82. Blades 73, 83, connected in parallel to the terminal 5 serve to apply the power supply. These blades may occupy any angular position. The primary winding 1 of the output transformer T is connected between stator blades 72, 82; the primary winding 1' of the output transformer T' is connected between stator blades 71, 81.

Figures 5A, 5B:
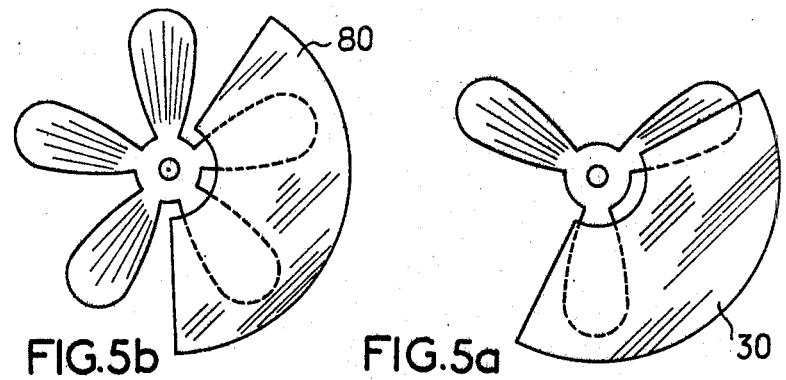
FIGS. 5a and 5b show two forms of rotor blades used in the invention.

FIGURES 5a and 5b show examples of rotors and auxiliary stators having three (FIGURE 5a) or five (FIGURE 5b) poles. In principle, the angular aperture of the auxiliary stator 30 has to be at least equal to that of a pole of the rotor plus a space between two consecutive poles. The angle of the auxiliary stator 30 has therefore to be of 120° for three poles; this is the value reproduced in FIGURE 5a. For five poles, the angle of the auxiliary stator 80 could be 72° but, in order to increase the coupling, a double angle 144° has been shown in FIGURE 5b.

In the technique of VHF waves, it is usual to produce balanced-unbalanced transformers of linear design such as T and T'.

Figure 6:
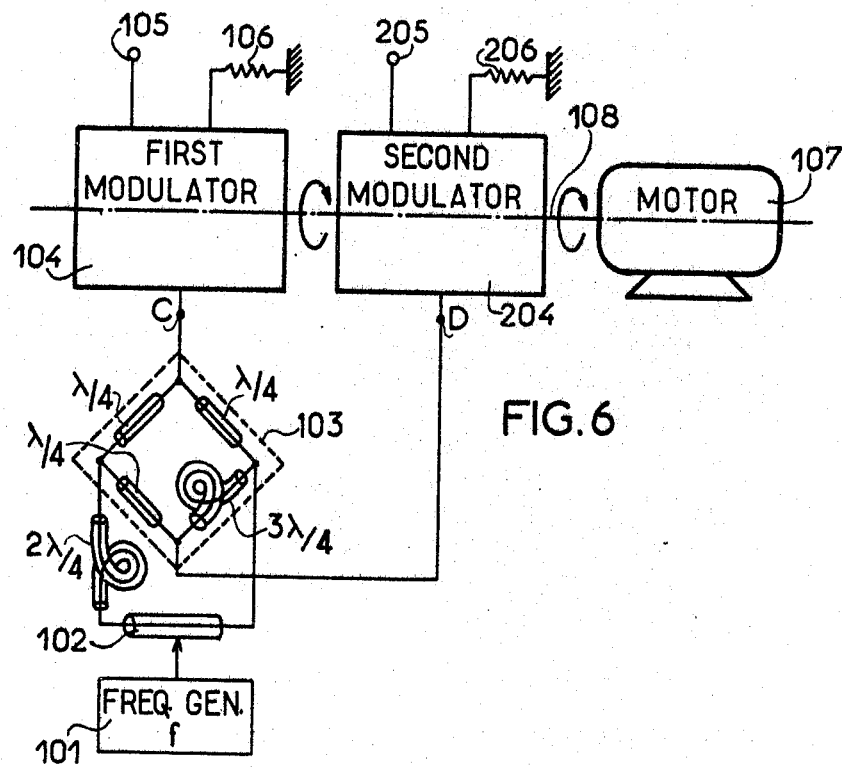
FIG. 6 is a general diagram of a lateral band generator using mechanical modulators conforming to the invention.

FIGURE 6 shows, as an example of the application of the invention, a block diagram of a lateral band generator, $f-90$ c./s., $f+90$ c./s., $f-150$ c./s., $f+150$ c./s., formed by a generator 101 of high frequency $f$, a co-axial line with variable connector 102 acting as a balance, a differential circuit 103 in the form of a bridge comprising one-quarter and three-quarter wavelength lines (all these members being known elsewhere) and two mechanical modulators according to the invention; a 90 c./s. modulator 104 and a 150 c./s. modulator 204 coupled on the same shaft 108 driven by a motor 107 revolving at a speed of 1800 r./m. (these hypothetical values are those preferred as an example), the aforesaid modulators delivering the currents required to two outputs, the one connected for instance onto a transmitting aerial 105 (90 c./s. modulation) and 205 (150 c./s. modulation) not shown in the diagram, whereas their other outputs, 106 and 206 respectively, deliver currents modulated in squaring with the previous currents to an artificial load (resistor).

Figure 7:
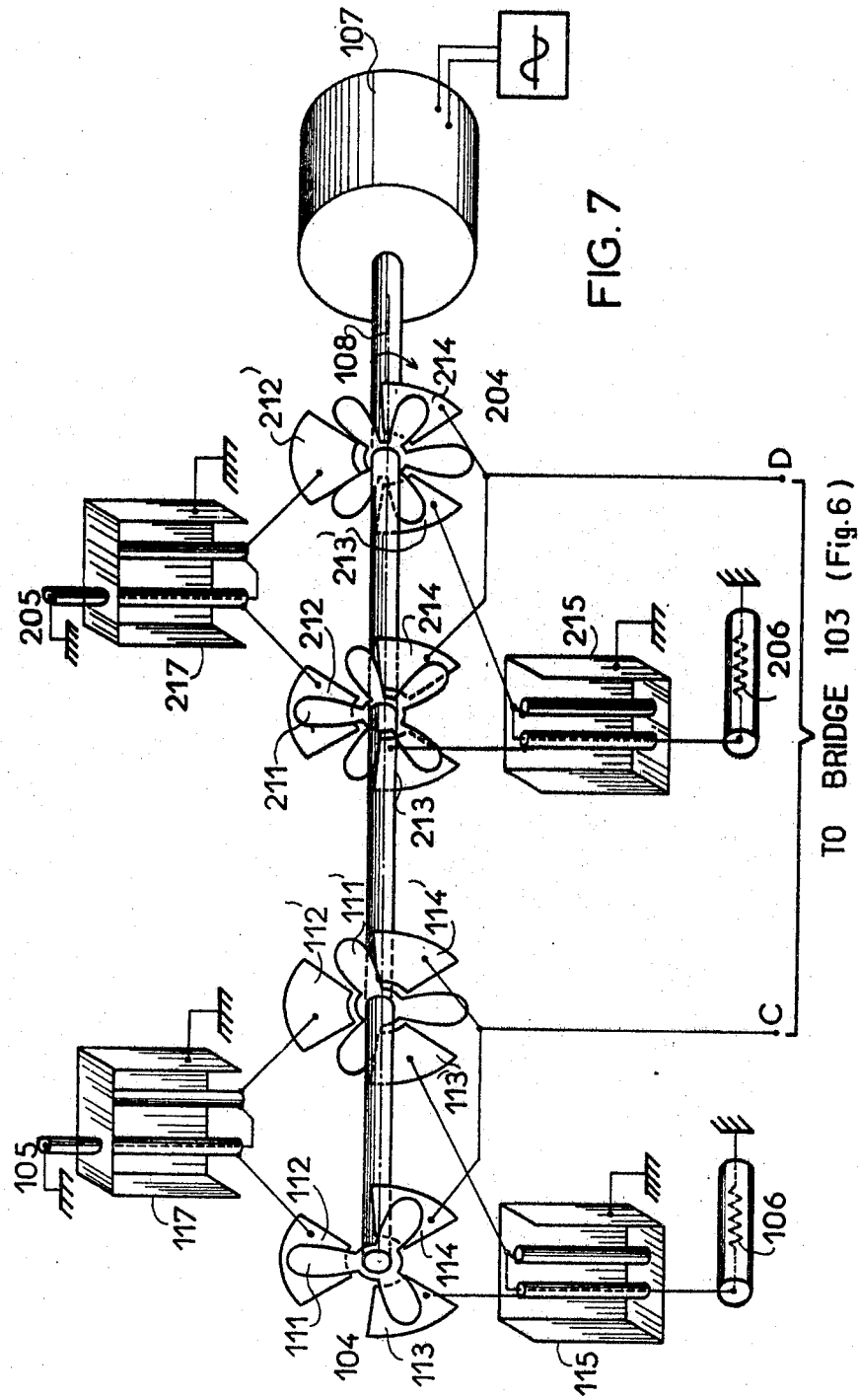
FIG. 7 is an "exploded" view of the generator as in FIG. 6.

In FIGURE 7, which is a half-perspective, half-block view of the arrangement explained above, the input terminals C and D are connected to the two outputs of the differential bridge 103 shown in FIGURE 6. The 90 c./s. modulator 104 has two rotors 111 and 111', each with three stator blades 112, 113, 114 and 112', 113' and 114'. The high frequency currents are applied to the blades 114 and 114'. The 90 c./s. modulated currents are extracted between the blades 112 and 112' through a line transformer 117 on a terminal 105. The currents modulated in squaring are taken between the blades 113 and 113' and directed through a line transformer 115 to an artificial load 106. As to 150 c./s. modulated currents, the procedure is the same with the corresponding elements which have reference numbers beginning with 200. Rotors 111 and 111', 211 and 211' are shifted as indicated in the description of FIGURE 4. The shaft 108, common to the rotors, is driven by a motor 107.

Although several embodiments of the invention have been depicted and described, it will be apparent that these embodiments are illustrative in nature and that a number of modifications in the apparatus and variations in its end use may be effected without departing from the spirit or scope of the invention as defined in the appended claims.

What I claim is:

1. In a modulated wave generator having the spectrum of two lateral bands on both sides of a suppressed carrier, the combination comprising: a power supply input terminal of alternating current having a frequency equal to that of said carrier wave, said input terminal connected to a first and a second variable capacitor each having a movable conducting element mounted on a shaft and a fixed conducting element cooperating with said movable conducting element, said variable capacitors being periodically variable with respect to time, said fixed conducting elements connected to the primary input terminals of a first differential transformer having a mid-point connected to ground, the secondary terminals of said first differential transformer constituting a first pair of output terminals for said generator, said input terminal connected to a third and fourth variable capacitor having movable conducting elements mounted on a shaft and fixed conducting elements cooperating with said movable conducting elements, said third and fourth variable capacitors having their fixed conducting elements connected respectively to the primary input terminals of a second differential transformer having a mid-point connected to ground, the secondary terminals of said second differential transformer constituting a second pair of output terminals for said generator, said fixed conducting elements being, respectively, one of the plates of each of said variable capacitors constituting said movable conducting elements, said movable elements connected to said power supply input terminal by means of a constant rotary capacitor mounted on said shaft, two separated stators cooperating respectively with two rotors electrically connected to each other, each rotor having plural conducting elements mounted on the same axis, said conducting elements of one of said rotors having an angular position complementary to the elements of the other rotor, each of said stators comprising a first conducting element having the same angular position connected respectively to the primary terminals of said first transformer and a second conducting element having an angular position shifted by 90° with respect to said first conducting element connected respectively to the primary terminals of said second transformer, and a third conducting element connected to said power supply terminal.

2. A generator according to claim 1, wherein the angular aperture of said third elements is such that the capacity between said third elements and said rotors is constant.

3. A generator according to claim 1, wherein said third elements have an angular aperture at least equal to the angular aperture of one of said conducting elements of said rotor plus the angular aperture between two consecutive conducting elements of said rotor.

References Cited

UNITED STATES PATENTS

| | | | |
|---|---|---|---|
| 1,854,733 | 4/1932 | Bozas | 343—109 |
| 2,095,758 | 10/1937 | Mabry | 332—56 X |
| 2,228,692 | 1/1941 | Davies | 332—56 X |
| 2,492,138 | 12/1949 | Earp | 332—56 X |
| 2,660,709 | 11/1953 | Hampshire et al. | 332—56 |

STANLEY M. URYNOWICZ, JR., Primary Examiner

JOSEPH F. BREIMAYER, Assistant Examiner

U.S. Cl. X.R.

332—56, 30, 44

PO-1050
(5/69)

UNITED STATES PATENT OFFICE
CERTIFICATE OF CORRECTION

Patent No. 3,484,786  Dated December 16, 1969

Inventor(s)  Jean Lattard

It is certified that error appears in the above-identified patent and that said Letters Patent are hereby corrected as shown below:

col. 3, line 43, "or" should read --of--; line 55, "bladse" should read --blades--; line 72, "One" should read --On--; in col. 6, line 16, between "pacitors" and "constituting" should be inserted --, the other plates of said variable capacitors-- so that the complete phrase will read --one of the plates of each of said variable capacitors, the other plates of said variable capacitors constituting said movable conducting elements,--

SIGNED AND
SEALED
JUN 16 1970

(SEAL)
Attest:

Edward M. Fletcher, Jr.
Attesting Officer

WILLIAM E. SCHUYLER, JR.
Commissioner of Patents